May 1, 1928.  S. A. COONEY  1,667,882
SALT CONTAINER
Filed Feb. 2, 1926
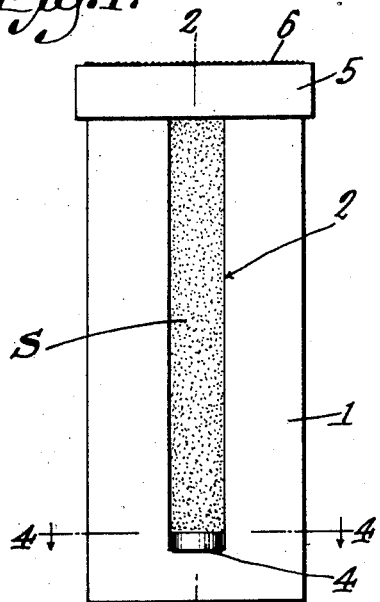
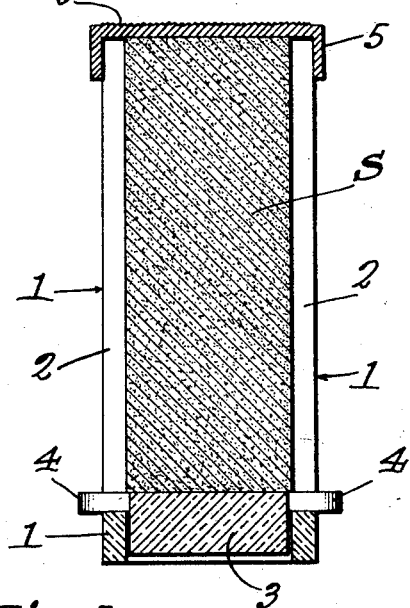
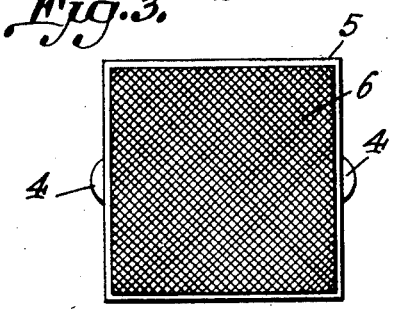
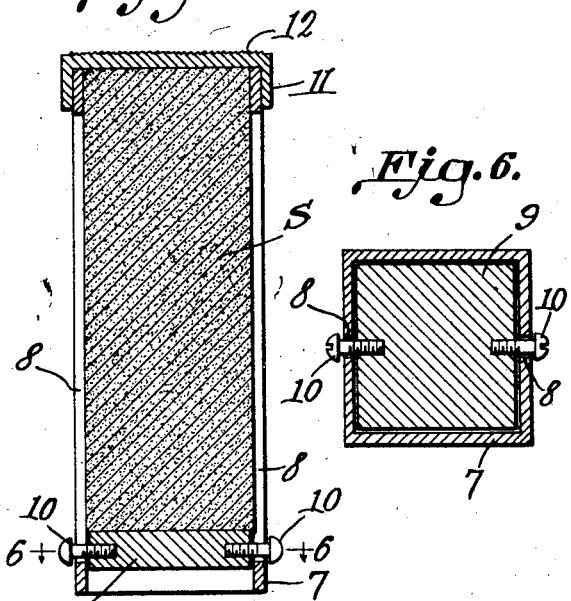
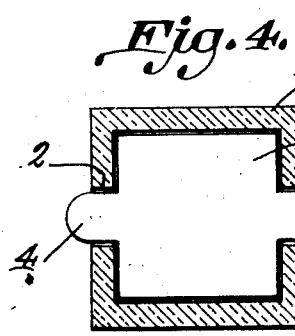
Sebern A. Cooney Inventor
By C A Snow & Co.
Attorneys Patented May 1, 1928.

1,667,882

UNITED STATES PATENT OFFICE.

SEBERN ALLEN COONEY, OF GLENBROOK, CONNECTICUT.

SALT CONTAINER.

Application filed February 2, 1926. Serial No. 83,534.

This invention relates to a container designed primarily for use in dispensing salt from a cake.

One of the objects of the invention is to provide a container which can be manufactured readily of earthen ware, glass, or metal, is formed of few parts, and which can be utilized readily for delivering salt in desired quantities.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings,

Figure 1 is an elevation of a container constituting the present invention.

Figure 2 is a section on line 2—2 Figure 1.

Figure 3 is a top plan view.

Figure 4 is a section on line 4—4 Figure 1.

Figure 5 is a section similar to Figure 2 but showing a slightly modified structure.

Figure 6 is a section on section 6—6 Figure 5.

Referring to the figures by characters of reference 1 designates a tubular container open at the ends. This container can be of any desired cross sectional contour and can be formed of earthen ware, glass, metal or any other suitable material. If formed of earthen ware or the like the container is provided in opposed sides with slots 2 extending longitudinally of the container and opening at the top of the container but terminating above the bottom thereof. In this container is slidably mounted a follower 3 which can be formed of the same material as that of which the container is formed and ears 4 may be extended oppositely from this follower so as to slide within the slots 2 and project slightly therebeyond. A cover 5 is adapted to close the top of the container, this cover being easily removable and being provided with a roughened top surface as indicated at 6. This top surface constitutes a grater as hereinafter explained.

The salt used in connection with the container is molded under pressure so as to form a hard cake adapted to fit snugly within the container and to fill the space between the follower 3 and the top of the container. When it is desired to dispense a portion of the salt the cover 5 is removed and inverted. The follower 3 is then shifted longitudinally either by pressing against the bottom thereof or by pushing against the ears 4. This will result in the cake of salt being pressed longitudinally so that the end thereof will be slightly projected beyond the end of the container. The roughened or grating surface 6 of the cover is then used for abrading the exposed portion of the cake so that the loose particles of salt will be delivered from the container. After the projecting portion has been scraped off to a level with the end of the container, the cake will remain in place by frictional engagement with the walls of the container or, in the structure shown in Figures 5 and 6, the screws can be tightened to support the cake against movement back to its initial position. Consequently, when the cap 12 is placed in position, it will protect the end of the cake from the admission of dust and insects.

If desired, and as shown in Figures 5 and 6, the container 7 may have its slots 8 closed at the top as well as at the bottom. Where such a construction is used the follower 9 has lateral projections 10 insertable through the slots 8 into engagement with the follower. The cap 11 is similar to the one heretofore explained and is provided with an abrading surface 12.

It will be noted that with the structure disclosed it is unnecessary to use springs or other metal parts if it is desired to dispense with them and, consequently, an article can be made which will not corrode by the action of the contents.

What is claimed is:

The combination with a container for holding a cake of salt, of a follower slidably mounted in the container for engaging one end of the cake of salt to shift said cake longitudinally of the container, a cover for closing one end of the container normally bearing upon all portions of and protecting one end of the cake of salt, said cover being imperforate and having its outer surface roughened to constitute an abrading portion, said cover being removable and reversible to bring the abrading portion into sliding engagement with the end of the cake of salt, and means for holding the follower and the cake against movement away from the cover.

In testimony that I claim the foregoing as my own, I have hereto affixed my signature.

SEBERN ALLEN COONEY.